US010093799B2

(12) United States Patent
Minami et al.

(10) Patent No.: US 10,093,799 B2
(45) Date of Patent: Oct. 9, 2018

(54) POLYESTER RESIN COMPOSITION AND POLYESTER RESIN FORMED ARTICLE

(71) Applicant: Kaneka Corporation, Osaka (JP)

(72) Inventors: Tetsuya Minami, Osaka (JP); Noriyuki Suzuki, Osaka (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 15/645,232

(22) Filed: Jul. 10, 2017

(65) Prior Publication Data

US 2017/0306145 A1 Oct. 26, 2017

Related U.S. Application Data

(63) Continuation of application No. PCT/JP2016/000119, filed on Jan. 12, 2016.

(30) Foreign Application Priority Data

Jan. 13, 2015 (JP) ................................ 2015-004220

(51) Int. Cl.
*C08K 5/05* (2006.01)
*C08L 67/04* (2006.01)

(52) U.S. Cl.
CPC ........... *C08L 67/04* (2013.01); *C08L 2201/06* (2013.01); *C08L 2201/08* (2013.01); *C08L 2205/02* (2013.01); *C08L 2205/06* (2013.01)

(58) Field of Classification Search
CPC .. C08L 67/04; C08L 2205/02; C08L 2201/08; C08L 2201/06; C08L 2205/06
USPC ........................................................ 524/387
See application file for complete search history.

(56) References Cited

U.S. PATENT DOCUMENTS

2007/0027247 A1* 2/2007 Ueda ........................ C08K 3/34 524/445
2016/0251494 A1 9/2016 Koyama et al.
2017/0362396 A1* 12/2017 Minami .................... C08J 3/22

FOREIGN PATENT DOCUMENTS

JP 2008-239645 A 10/2008
JP 2009-144056 A 7/2009
JP 2010-132816 A 6/2010
JP 2010-142986 A 7/2010
JP 2010-202757 A 9/2010
JP 2012-87207 A 5/2012
JP 2013-129777 A 7/2013
WO 2014/061243 A1 4/2014
WO 2014/125764 A1 8/2014
WO 2015/001706 A1 1/2015
WO 2015/052876 A1 4/2015

OTHER PUBLICATIONS

International Search Report issued in International Application No. PCT/JP2016/000119; dated Mar. 22, 2016 (2 pages).
Written Opinion issued in International Application No. PCT/JP2016/000119; dated Mar. 22, 2016 (4 pages).
Extended European Search Report issued in European Application No. 16737199.6, dated May 25, 2018 (5 pages).

* cited by examiner

*Primary Examiner* — William K Cheung
(74) *Attorney, Agent, or Firm* — Osha Liang LLP

(57) ABSTRACT

A polyester resin composition includes: a polylactic acid; a poly(3-hydroxyalkanoate); pentaerythritol; and a silicate. In the polyester resin composition, an amount of the polylactic acid is from 55 to 75 parts by weight, and an amount of the poly(3-hydroxyalkanoate) (B) is from 25 to 45 parts by weight, with respect to 100 parts by weight of a total amount of the polylactic acid and the poly(3-hydroxyalkanoate); an amount of the pentaerythritol is from 0.05 to 20 parts by weight with respect to 100 parts by weight of the total amount of the polylactic acid and the poly(3-hydroxyalkanoate); and an amount of the silicate is from 10 to 40 parts by weight with respect to 100 parts by weight of the total amount of the polylactic acid and the poly(3-hydroxyalkanoate).

5 Claims, No Drawings

POLYESTER RESIN COMPOSITION AND POLYESTER RESIN FORMED ARTICLE

This application is a continuation application of PCT/JP2016/000119, filed Jan. 12, 2016, which claims the priority under 35 U.S.C. § 119 to Japan patent application number 2015-004220, filed Jan. 13, 2015. The contents of Japan patent application number 2015-004220 are incorporated herein by reference in their entirety.

TECHNICAL FIELD

One or more embodiments of the present invention relate to a polyester resin composition and a polyester resin formed article. One or more embodiments of the present invention particularly relate to a polyester resin composition and a polyester resin formed article that contain a biodegradable polyester resin degradable by microorganisms.

BACKGROUND

Large amounts of petroleum-based plastics are disposed of every year, and serious problems caused by the large amounts of wastes, such as shortage of landfills and environment pollution, have been discussed. Under the circumstances, biodegradable plastics have been drawing attention since biodegradable plastics are degraded by the action of microorganisms in the environment, landfills, or composts. Biodegradable plastics are under development with the aim of expanding their application to materials for use in the environment in agriculture, forestry, and fisheries, and also to food containers, packaging materials, sanitary materials, and garbage bags, which are difficult to recover/recycle after use.

Among them, from the viewpoint of reducing carbon dioxide emission or carbon dioxide fixation (carbon neutral), polyhydroxyalkanoates (hereinafter, abbreviated as "PHA" in some cases), which are plant-derived aliphatic polyesters, have been drawing attention. Among polyhydroxyalkanoates, in particular, polylactic acids (hereinafter, abbreviated as "PLA" in some cases) have been drawing attention because lactic acid, which is the raw material of the polylactic acids, is inexpensive for the reason that it is produced by fermentation using sugars that are extracted from corn, potato, or the like, and also because PLA resins are highly rigid and highly transparent.

However, the glass-transition temperature of such a polylactic acid is around 55° C. Therefore, the thermal resistance of the polylactic acid is insufficient and the application thereof is limited. In addition, since the crystallization speed of the polylactic acid is slow, even if the polylactic acid is kept around 100° C. at which its crystallization is most facilitated, it takes a long period of time to complete the crystallization, resulting in poor productivity. In order to improve the thermal resistance and processability, there is proposed a method of mixing a polylactic acid resin with another resin and a soluble azo lake pigment serving as a crystal nucleating agent (Patent Literature 1).

CITATION LIST

Patent Literature

PTL 1: Japanese Laid-Open Patent Application Publication No. 2010-132816

SUMMARY

However, since Patent Literature 1 involves the use of a non-biodegradable resin, sufficient biodegradability cannot be obtained. In addition, substantially high advantages are not obtained in Patent Literature 1 in terms of thermal resistance and processability. Thus, further improvements are necessary. In view of the current circumstances, one or more embodiments of the present invention provide a resin composition and a resin formed article that make it possible to improve the thermal resistance, which is a drawback of polylactic acids, and suppress burr formation, which is a drawback of poly(3-hydroxyalkanoates).

The inventors conducted diligent studies to improve the thermal resistance and processability of a polylactic acid. As a result of the studies, they have found that by mixing the polylactic acid with three components that are a poly(3-hydroxyalkanoate) (hereinafter, abbreviated as "P3HA" in some cases), pentaerythritol, and a silicate, the thermal resistance of the polylactic acid can be improved, and also, the processability of the polylactic acid can be improved significantly. Based on the findings, they have arrived at one or more embodiments of the present invention. That is, one or more embodiments of the present invention provide a polyester resin composition according to [1] to [3] as described below and a polyester resin formed article according to [4] as described below.

[1] A polyester resin composition including: a polylactic acid (A); a poly(3-hydroxyalkanoate) (B); pentaerythritol (C); and a silicate (D). In the polyester resin composition, an amount of the polylactic acid (A) is from 55 to 75 parts by weight, and an amount of the poly(3-hydroxyalkanoate) (B) is from 25 to 45 parts by weight, with respect to 100 parts by weight of a total amount of the polylactic acid (A) and the poly(3-hydroxyalkanoate) (B); an amount of the pentaerythritol (C) is from 0.05 to 20 parts by weight with respect to 100 parts by weight of the total amount of the polylactic acid (A) and the poly(3-hydroxyalkanoate) (B); and an amount of the silicate (D) is from 10 to 40 parts by weight with respect to 100 parts by weight of the total amount of the polylactic acid (A) and the poly(3-hydroxyalkanoate) (B).

[2] The polyester resin composition according to the above [1], in which the silicate (D) is at least one selected from the group consisting of talc, mica, kaolinite, montmorillonite, and smectite.

[3] The polyester resin composition according to the above [1] or [2], in which the poly(3-hydroxyalkanoate) (B) is at least one selected from the group consisting of poly(3-hydroxybutyrate), poly(3-hydroxybutyrate-co-3-hydroxyvalerate), poly(3-hydroxybutyrate-co-3-hydroxyvalerate-co-3-hydroxyhexanoate), poly(3-hydroxybutyrate-co-3-hydroxyhexanoate), and poly(3-hydroxybutyrate-co-4-hydroxybutyrate).

[4] A polyester resin formed article formed by melting the polyester resin composition according to any one of the above [1] to [3] and then forming the molten polyester resin composition at 25 to 55° C.

One or more embodiments of the present invention make it possible to improve the thermal resistance, which is a drawback of polylactic acids, improve the processability of polylactic acids in injection molding or extrusion forming, and suppress molding defects, such as burr formation.

DESCRIPTION OF EMBODIMENTS

Hereinafter, a polyester resin composition according to one or more embodiments of the present invention is described in detail. However, the present invention is not limited to the embodiments described below.

The polyester resin composition according to one or more embodiments of the present invention contains a polylactic acid (A), a poly(3-hydroxyalkanoate) (B), pentaerythritol (C), and a silicate (D). Hereinafter, the polylactic acid (A), the poly(3-hydroxyalkanoate) (B), the pentaerythritol (C), and the silicate (D) are described.

[Polylactic Acid (A)]

The polylactic acid (A) used in one or more embodiments of the present invention contains a repeating unit represented by a general formula (1) shown below.

[Chem. 1]

$$[\text{—CH(CH}_3\text{)—CO—O—}] \qquad \text{General Formula (1)}$$

The polylactic acid (A) is at least one selected from polylactic acids each containing the repeating unit represented by the general formula (1).

The polylactic acid (A) used in one or more embodiments of the present invention may contain other repeating units, so long as the polylactic acid (A) contains 50 mol % or more of the repeating unit represented by the general formula (1) with respect to the total repeating units. The polylactic acid (A) may be poly(D-lactic acid), poly(L-lactic acid), a copolymer of D-lactic acid and L-lactic acid, or a stereocomplex formed by blending these.

If forming (i.e., processing) is performable, the molecular weight and the molecular weight distribution of the polylactic acid (A) are not particularly limited. The weight-average molecular weight of a polylactic acid may be from 50,000 to 300,000 from the viewpoint of excellent balance between physical properties and processability of the formed article. The weight-average molecular weight of the polylactic acid may be from 100,000 to 250,000. In one or more embodiments, the weight-average molecular weight of the polylactic acid is obtained from a molecular weight distribution (in terms of polystyrene) that is measured by using gel permeation chromatography (GPC) using a chloroform solution. A column used in the GPC may be any column suitable for measuring the molecular weight.

In one or more embodiments of the present invention, a commercially available polylactic acid, for example, "Ingeo" (registered trademark) available from NatureWorks LLC or "REVODE" (registered trademark) available from Zhejiang Hisun Biomaterials Co., Ltd. may be used.

The amount of the polylactic acid used in one or more embodiments of the present invention is such that the amount of the polylactic acid may be at least 55 parts by weight, at least 58 parts by weight, or at least 60 parts by weight with respect to 100 parts by weight of the total amount (A+B) of the polylactic acid (A) and the poly(3-hydroxyalkanoate) (B) from the viewpoint of excellent burr formation suppressing effect of the obtained formed article. Further, the amount of the polylactic acid may be at most 75 parts by weight, at most 73 parts by weight, or at most 70 parts by weight with respect to 100 parts by weight of the total amount of the polylactic acid and the poly(3-hydroxyalkanoate) from the viewpoint of excellent thermal resistance.

[Poly(3-Hydroxyalkanoate) (B)]

The poly(3-hydroxyalkanoate) (B) used in one or more embodiments of the present invention contains a repeating unit represented by a general formula (2) shown below.

[Chem. 2]

$$[\text{—CHR—CH}_2\text{—CO—O—}] \qquad \text{General Formula (2)}$$

(In the general formula (2), R is an alkyl group represented by $C_nH_{2n+1}$ and n is an integer of not less than 1 and not more than 15.)

The poly(3-hydroxyalkanoate) (B) may be at least one selected from microorganism-derived P3HAs that are produced from microorganisms and each of which contains the repeating unit represented by the general formula (2).

The poly(3-hydroxyalkanoate) (B) used in one or more embodiments of the present invention may contain other repeating units, so long as the poly(3-hydroxyalkanoate) (B) contains 50 mol % or more of the repeating unit represented by the general formula (2) with respect to the total repeating units.

The microorganisms that produce the microorganism-derived P3HAs are not particularly limited, so long as they have the ability to produce P3HAs. For example, *Bacillus megaterium* is the first discovered poly(3-hydroxybutyrate)-producing microorganism (hereinafter, poly(3-hydroxybutyrate) is abbreviated as "P3HB" in some cases), which was discovered in 1925, and natural microorganisms such as *Cupriavidus necator* (formerly classified as *Alcaligenes eutrophus, Ralstonia eutropha*) and *Alcaligenes latus* are known as other P3HB-producing microorganisms. These microorganisms accumulate P3HB in their cells.

Further, known microorganisms that produce copolymers of hydroxybutyrate and another hydroxyalkanoate are, for example, *Aeromonas caviae*, which produces poly(3-hydmxybutyrate-co-3-hydroxyvalerate) (hereinafter, abbreviated as "P3HB3HV" in some cases) and poly(3-hydroxybutyrate-co-3-hydroxyhexanoate) (hereinafter, abbreviated as "P3HB3HH" in some cases), and *Alcaligenes eutrophus*, which produces poly(3-hydroxybutyrate-co-4-hydroxybutyrate) (hereinafter, abbreviated as "P3HB4HB" in some cases). In particular, a P3HB3HH-producing microorganism may be, for example, *Alcaligenes eutrophus* AC32, FERM BP-6038 (T. Fukui, Y. Doi, J. Bateriol., 179, p. 4821-4830 (1997)), in which a P3HA synthase gene is introduced to improve P3HB3HH productivity. These microorganisms are cultured under proper conditions, and the resulting microorganism cells having P3HB3HH accumulated therein are used. Other than the above microorganisms, genetically-modified microorganisms may also be used, in which various P3HA synthesis-related genes are introduced in accordance with the intended type of P3HA to be produced, and culture conditions including the type of a substrate may be optimized.

The molecular weight of the microorganism-derived P3HA used in one or more embodiments of the present invention is not particularly limited, so long as the microorganism-derived P3HA substantially exhibits sufficient physical properties for the intended use. If the molecular weight is too low, the obtained formed article has low strength. On the other hand, if the molecular weight is too high, the processability is reduced, and therefore preparing the formed article is difficult. In consideration of these, the weight-average molecular weight of the microorganism-derived P3HA used in one or more embodiments of the present invention may be in the range of 200,000 to 2,500,000, in the range of 250,000 to 2,000,000, or in the range of 300,000 to 1,000,000. In one or more embodiments, the weight-average molecular weight of the P3HA is obtained from a molecular weight distribution (in terms of polystyrene) that is measured by using gel permeation chromatography (GPC) using a chloroform solution. A column used in the GPC may be any column suitable for measuring the molecular weight.

The microorganism-derived P3HA usable in one or more embodiments of the present invention may be a polymer resin that contains 80 mol % or more of 3-hydroxybutyrate. The microorganism-derived P3HA usable in one or more embodiments of the present invention may be a polymer resin that contains 85 mol % or more of 3-hydroxybutyrate and that is produced by a microorganism. Examples of the microorganism-derived P3HA include poly(3-hydroxybutyrate), poly(3-hydroxybutyrate-co-3-hydroxypropionate), poly(3-hydroxybutyrate-co-3-hydroxyvalerate), poly(3-hydroxybutyrate-co-3-hydroxyvalerate-3-hydroxyhexanoate), poly(3-hydroxybutyrate-co-3-hydroxyhexanoate), poly(3-hydroxybutyrate-co-3-hydroxyheptanoate), poly(3-hydroxybutyrate-co-3-hydroxyoctanoate), poly(3-hydroxybutyrate-co-3-hydroxynonanoate), poly(3-hydroxybutyrate-co-3-hydroxydecanoate), poly(3-hydroxybutyrate-co-3-hydroxyundecanoate), and poly(3-hydroxybutyrate-co-4-hydroxybutyrate). In particular, from the viewpoint of processability or physical properties of the formed article, poly(3-hydroxybutyrate), poly(3-hydroxybutyrate-co-3-hydroxyvalerate), poly(3-hydroxybutyrate-co-3-hydroxyvalerate-3-hydroxyhexanoate), poly(3-hydroxybutyrate-co-3-hydroxyhexanoate), and poly(3-hydroxybutyrate-co-4-hydroxybutyrate) may be used.

From the viewpoint of, for example, processability, productivity, or the quality of the formed article, the composition ratio of 3-hydroxybutyrate (hereinafter, abbreviated as "3HB" in some cases) to a comonomer copolymerized therewith (e.g., 3-hydroxyvalerate (hereinafter, abbreviated as "3HV" in some cases), 3-hydroxyhexanoate (hereinafter, abbreviated as "3HH" in some cases), or 4-hydroxybutyrate (hereinafter, abbreviated as "4HB" in some cases)) in the polyester resin, that is, the ratio of monomers in a copolymer resin, may be from 3-hydroxybutyrate/comonomer=97/3 to 80/20 (mol %/mol %), or from 95/5 to 85/15 (mol %/mol %).

The ratio of each monomer in the poly(3-hydroxyalkanoate) can be measured by gas chromatography in a manner described below. In a vessel, 2 ml of a sulfuric acid/methanol mixed liquid (15/85 (weight ratio)) and 2 ml of chloroform are added to about 20 mg of the dry polyester resin, and the vessel is tightly sealed. Then, the resulting mixture is heated at 100° C. for 140 minutes to obtain a methyl ester of poly(3-hydroxyalkanoate) degradation product. After cooling the mixture, 1.5 g of sodium hydrogen carbonate is added thereto little by little for neutralization, and the resulting mixture is left as it is until generation of carbon dioxide stops. The mixture is well mixed with 4 ml of diisopropyl ether added thereto, and then the monomer unit composition of the poly(3-hydroxyalkanoate) degradation product in a supernatant is analyzed by capillary gas chromatography to determine the ratio of each monomer in the poly(3-hydroxyalkanoate).

The gas chromatography can be performed by using "GC-17A" manufactured by Shimadzu Corporation as a gas chromatograph and "NEUTRA BOND-1" (with a column length of 25 m, a column inner diameter of 0.25 mm, and a liquid film thickness of 0.4 μm) manufactured by GL Sciences Inc. as a capillary column. He gas is used as a carrier gas; the column inlet pressure is set to 100 kPa; and a sample is injected in an amount of 1 μl Temperature conditions are as follows: the temperature is increased from an initial temperature of 100° C. to 200° C. at a rate of 8° C./min, and is further increased from 200° C. to 290° C. at a rate of 30° C./min The amount of the poly(3-hydroxyalkanoate) used in one or more embodiments of the present invention is such that the amount of the poly(3-hydroxyalkanoate) may be at least 25 parts by weight, at least 28 parts by weight, or at least 30 parts by weight with respect to 100 parts by weight of the total amount (A+B) of the polylactic acid (A) and the poly(3-hydroxyalkanoate) (B) from the viewpoint of excellent thermal resistance. The amount of the P3HA may be at most 45 parts by weight, at most 42 parts by weight, or at most 40 parts by weight with respect to 100 parts by weight of the total amount (A+B) of the polylactic acid (A) and the poly(3-hydroxyalkanoate) (B) from the viewpoint of excellent burr formation suppressing effect of the obtained formed article.

[Pentaerythritol (C)]

The pentaerythritol (C) used in one or more embodiments of the present invention is a polyhydric alcohol represented by a general formula (3) shown below.

[Chem. 3]

General Formula (3)

HO OH
HO OH

The pentaerythritol (C) is one kind of polyhydric alcohol represented by the general formula (3), and is a white crystalline organic compound having a melting point of 260.5° C. The pentaerythritol (C) is classified as a sugar alcohol that is not derived from a natural product and that can be synthesized by condensation of acetaldehyde and formaldehyde under basic conditions.

The pentaerythritol (C) used in one or more embodiments of the present invention is not particularly limited, so long as it is commonly available, and may be one provided as a reagent or an industrial product. Examples of the reagent include, but are not limited to, those available from Wako Pure Chemical Industries, Ltd., Sigma-Aldrich, Tokyo Chemical Industries Co., Ltd., and Merck. Examples of the industrial product include, but are not limited to, one available from Koei Chemical Co., Ltd., (trade name: Pentarit), one available from The Nippon Synthetic Chemical Industry Co., Ltd. (trade name: Neulizer P), and one available from Toyo Chemicals Co., Ltd.

Some of such commonly-available reagents and industrial products contain, as an impurity, an oligomer produced by dehydration condensation of the pentaerythritol (C), such as dipentaerythritol or tripentaerythritol. Although the oligomer does not have the effect of crystallizing polyhydroxyalkanoates, the oligomer does not inhibit the crystallization effect of the pentaerythritol (C). Therefore, the oligomer may be contained in the reagent or industrial product used in one or more embodiments of the present invention.

The amount of the pentaerythritol (C) used in one or more embodiments of the present invention is such that the amount of the pentaerythritol may be at least 0.05 parts by weight, at least 0.1 parts by weight, or at least 0.5 parts by weight with respect to 100 parts by weight of the total amount (A+B) of the polylactic acid (A) and the poly(3-hydroxyalkanoate) (B) so that the pentaerythritol (C) will exert its effect as a crystal nucleating agent to a high degree. Further, the amount of the pentaerythritol may be at most 20 parts by weight, at most 12 parts by weight, at most 10 parts by weight, or at most 8 parts by weight with respect to 100 parts by weight of the total amount (A+B) of the polylactic acid (A) and the poly(3-hydroxyalkanoate) (B) from the viewpoint of excellent flow properties of the resin during processing.

[Silicate (D)]

The silicate used in one or more embodiments of the present invention is not particularly limited, so long as it has the effect of, for example, improving the thermal resistance and processability. For example, talc, mica, kaolinite, montmorillonite, or smectite may be used since they are highly versatile, have a high effect of improving mechanical strength, have a narrow particle diameter distribution, and hardly inhibit surface smoothness and mold transferability.

Not only one kind of silicate but two kinds of silicates may be mixed. The mixture ratio is suitably adjustable in accordance with the kind of the polylactic acid (A), the kind of the poly(3-hydroxyalkanoate) (B), and intended effects.

The amount of the silicate (D) used in one or more embodiments of the present invention is such that the amount of the silicate may be at least 10 parts by weight, at least 13 parts by weight, or at least 15 parts by weight with respect to 100 parts by weight of the total amount (A+B) of the polylactic acid (A) and the poly(3-hydroxyalkanoate) (B) from the viewpoint of excellent thermal resistance. Further, the amount of the silicate may be at most 40 parts by weight, at most 37 parts by weight, or at most 35 parts by weight with respect to 100 parts by weight of the total amount of (A+B) of the polylactic acid (A) and the poly(3-hydroxyalkanoate) (B) from the viewpoint of excellent processability.

The silicate used in one or more embodiments of the present invention may be surface-treated in order to improve its dispersibility in the polyester resin composition. Examples of the surface treatment include surface treatment with a higher fatty acid, silane coupling agent, titanate coupling agent, sol-gel coating agent, or a resin coating agent.

The water content of the silicate used in one or more embodiments of the present invention may be from 0.01 to 10%, from 0.01 to 5%, or from 0.01 to 1% so that hydrolysis of the polylactic acid (A) and the poly(3-hydroxyalkanoate) (B) can be readily suppressed. In one or more embodiments, the water content of the silicate is measured by a method complying with JIS-K5101.

The mean particle diameter of the silicate used in one or more embodiments of the present invention may be from 0.1 to 100 μm, or from 0.1 to 50 μm, from the viewpoint of excellent polyester resin composition properties and processability. In one or more embodiments, the mean particle diameter is measured by a method using a laser diffraction/scattering device, such as "Microtrac MT3100 II" manufactured by Nikkiso Co., Ltd.

In one or more embodiments, both the silicate and the pentaerythritol (C) have a function as a crystal nucleating agent. By allowing the silicate to coexist with the pentaerythritol (C), the crystallization of the polyester resin composition can be further facilitated and the processability thereof can be improved.

Examples of the silicate (D) used in one or more embodiments of the present invention are indicated below.

In the case of using talc as the silicate, examples thereof include general-purpose talc and surface-treated talc. Specific examples of the talc used as the silicate include "MICRO ACE" (registered trademark) available from Nippon Talc Co., Ltd., "Talcan powder" (registered trademark) available from Hayashi-Kasei Co., Ltd., and talc products available from TAKEHARA KAGAKU KOGYO CO., LTD. and MARUO CALCIUM CO., LTD.

In the case of using mica as the silicate, examples thereof include wet ground mica and dry ground mica. Specific examples of the mica used as the silicate include mica products available from YAMAGUCHI MICA CO., LTD. and Keiwa Rozai Co., Ltd.

In the case of using kaolinite as the silicate, examples thereof include dry kaolin, baked kaolin, and wet kaolin. Specific examples of the kaolinite used as the silicate include "TRANSLINK" (registered trademark), "ASP" (registered trademark), "SANTINTONE" (registered trademark), and "ULTREX" (registered trademark) available from Hayashi-Kasei Co., Ltd. and a kaolinite product available from Keiwa Rozai Co., Ltd.

The polyester resin composition according to one or more embodiments of the present invention, which contains the polylactic acid (A), the poly(3-hydroxyalkanoate) (B), the pentaerythritol (C), and the silicate (D), has excellent processability, which cannot be realized by conventional resin compositions containing a polyhydroxyalkanoate resin. The excellent processability of the polyester resin composition according to one or more embodiments of the present invention allows the resin temperature during melting and the cooling temperature and cooling time of a mold or the like to be set over wide ranges.

A gap is present between joining portions (e.g., parting line portions, inserting portions, or slide-core sliding portions) of a cavity in a shaping-mold for injection molding. When a resin is injection-molded, the molten resin enters the gap to form "burrs" and then the burrs adhere to the formed article. Since poly(3-hydroxyalkanoates) are slow in terms of crystallization and the resins keep their fluidity for a long period of time, the burrs are easily formed and after-treatment of the formed article requires a lot of labor. However, the polyester resin composition according to one or more embodiments of the present invention, which contains the polylactic acid (A), the poly(3-hydroxyalkanoate) (B), the pentaerythritol (C), and the silicate (D), is solidified fast. For this reason, the burr formation hardly occurs. This makes is possible to reduce the labor for the after-treatment of the formed article. Therefore, the polyester resin composition according to one or more embodiments of the present invention may be used in terms of practicality.

The polyester resin composition according to one or more embodiments of the present invention can be readily produced by a known kneader, so long as the kneader is capable of heating polyhydroxyalkanoates including polylactic acids and poly(3-hydroxyalkanoates) to their melting points or higher and kneading them. As one example, a method in which the polylactic acid (A), the poly(3-hydroxyalkanoate) (B), the pentaerythritol (C), the silicate (D), and other components (if necessary) are melt-kneaded by, for example, an extruder, roll mill, or Banbury mixer, and thereby formed into pellets that are then subjected to molding can be adopted. As another example, a method in which a high-concentration master batch of the pentaerythritol (C) or the silicate (D) is prepared in advance, and the master batch is melt-kneaded with the polylactic acid (A) and the poly(3-hydroxyalkanoate) (B) at an intended ratio and then subjected to forming can be adopted.

The polylactic acid (A), the poly(3-hydroxyalkanoate) (B), the pentaerythritol (C), and the silicate (D) may be added into the kneader at the same time. Alternatively, the polylactic acid (A) and the poly(3-hydroxyalkanoate) (B) may be melted first, and then the pentaerythritol (C) and the silicate (D) may be added thereto.

The silicate may be added at last from the viewpoint of not deteriorating the properties of the obtained resin composition or formed article. That is, the silicate (D) may be added to a resin composition that has been obtained by melt-kneading the polylactic acid (A), the poly(3-hydroxyalkanoate) (B), and the pentaerythritol (C) at an intended ratio. In general, talc and mica contain water and indicate alkalinity. Therefore, if such talc or mica coexists with polyhydroxyalkanoates such as the polylactic acid (A) and the poly(3-hydroxyalkanoate) (B) at high temperatures, degradation of the polyhydroxyalkanoates may be facilitated, and thereby the mechanical properties of the resin composition may deteriorate.

Specifically, for example, in the case of preparing a resin composition by an intermeshed co-rotation twin screw extruder, the polylactic acid (A), the poly(3-hydroxyalkanoate) (B), and the pentaerythritol (C) may be added from the root of the screws (i.e., from the main hopper), and the silicate (D) may be added by, for example, side feeding at the downstream side of the extruder.

[Method of Producing Polyester Resin Formed Article]

Hereinafter, a method of producing a polyester resin formed article made of the polyester resin composition according to one or more embodiments of the present invention is described.

First, the polylactic acid (A), the poly(3-hydroxyalkanoate) (B), the pentaerythritol (C), the silicate (D), and other components (if necessary) are added into, and melt-kneaded by, an extruder, kneader, Banbury mixer, rolls, or the like to prepare a polyester resin composition, which is extruded as a strand and then cut to obtain pellets of the polyester resin composition. The particle shape of the pellets is, for example, columnar, elliptical columnar, spherical, cubic, or rectangular parallelepiped.

For the above melt-kneading of the polylactic acid (A), the poly(3-hydroxyalkanoate) (B), the pentaerythritol (C), the silicate (D), and others, the melt-kneading temperature cannot be uniformly specified since the melt-kneading temperature depends on, for example, the melting points and melt viscosities of the polylactic acid and the poly(3-hydroxyalkanoate) in use. However, the temperature of the melt-kneaded resin at the die hole may be from 160 to 200° C., from 165 to 195° C., or from 170 to 190° C. If the temperature of the melt-kneaded resin at the die outlet is less than 160° C., there is a possibility that the polylactic acid (A) and the poly(3-hydroxyalkanoate) (B) are not melted sufficiently. If the temperature of the melt-kneaded resin at the die outlet is higher than 200° C., there is a possibility that the poly(3-hydroxyalkanoate) (B) is degraded.

The pellets prepared by the above method are sufficiently dried at 40 to 80° C. to remove water therefrom. Then, the pellets are subjected to processing by a known processing method. In this manner, an intended formed article can be obtained.

Regarding temperatures in forming (forming temperatures), the temperature of the molten resin may be from 160 to 200° C. or from 170 to 190° C. from the viewpoint of excellent appearance in terms of, for example, coloring, and thereafter, the temperature of, for example, rolls and a mold, i.e., the cooling temperature may be from 25 to 55° C. or from 30 to 50° C. when forming.

Examples of an adoptable processing method include injection molding, extrusion forming, film forming, sheet forming, blow molding, fiber spinning, extrusion foaming, and expanded bead molding.

Examples of an adoptable injection-molded article producing method include the following injection molding methods: an injection molding method commonly used to mold a thermoplastic resin; a gas assist molding method; and an injection compression molding method. Also, according to intended use, any injection molding method other than the above methods is adoptable, such as an in-mold forming method, a gas press molding method, a two-color molding method, a sandwich molding method, PUSH-PULL, or SCORIM. It should be noted that adoptable injection molding methods are not limited to these examples.

Examples of an adoptable film-formed body producing method include T-die extrusion forming, calendaring, roll forming, and film blowing. However, the film forming method is not limited to these examples. A film obtained from the polyester resin composition according to one or more embodiments of the present invention can be subjected to thermoforming by heating, vacuum forming, or press molding.

The polyester resin composition according to one or more embodiments of the present invention contains the polylactic acid (A), the poly(3-hydroxyalkanoate) (B), the pentaerythritol (C), and the silicate (D), and in addition, the polyester resin composition may contain other components, such as an antioxidant, an ultraviolet absorber, a colorant such as a dye or pigment, a plasticizer, a lubricant, an inorganic filler, an organic filler, or an antistatic agent. The additive amounts of these other components are not particularly limited, so long as advantageous effects of one or more embodiments of the present invention are not impaired.

The polyester resin composition according to one or more embodiments of the present invention is excellent in terms of thermal resistance and processability, and it can be processed in a short time and is suitable for use as a base material of, for example, tableware, agricultural materials, parts for OA equipment, parts for home appliances, automobile components, everyday sundries, stationery, various molded bottles, extruded sheets, and profile-extruded products.

EXAMPLES

Hereinafter, one or more embodiments of the present invention is specifically described with reference to examples, but the technical scope of one or more embodiments of the present invention is not limited by these examples.

Polylactic acid (A): products indicated below were used.

PLA-1: Ingeo 3251D manufactured by NatureWorks LLC
PLA-2: Ingeo 3260HP manufactured by NatureWorks LLC
PLA-3: Ingeo 4060D manufactured by NatureWorks LLC Poly(3-hydroxyalkanoate) (B): production examples and products indicated below were used. P3HA-1: one obtained in Production Example 1 was used.

Production Example 1

Culture production was performed by using KNK-005 strain (see U.S. Pat. No. 7,384,766).

The composition of a seed medium was: 1 w/v % Meat-extract, 1 w/v % Bacto-Tryptone, 0.2 w/v % Yeast-extract, 0.9 w/v % $Na_2HPO_4.12H_2O$, and 0.15 w/v % $KH_2PO_4$ (pH 6.8).

The composition of a preculture medium was: 1.1 w/v % $Na_2HPO_4.12H_2O$, 0.19 w/v % $KH_2PO_4$, 1.29 w/v % $(NH_4)_2SO_4$, 0.1 w/v % $MgSO_4.7H_2O$, and 0.5 v/v % trace metal salt solution (prepared by dissolving, in 0.1 N hydrochloric acid, 1.6 w/v % $FeCl_3.6H_2O$, 1 w/v % $CaCl_2.2H_2O$, 0.02 w/v % $CoCl_2.6H_2O$, 0.016 w/v % $CuSO_4.5H_2O$, and 0.012 w/v % $NiCl_2.6H_2O$). Palm oil was added at one time as a carbon source at a concentration of 10 g/L.

The composition of a P3HA production medium was: 0.385 w/v % $Na_2HPO_4.12H_2O$, 0.067 w/v % $KH_2PO_4$, 0.291 w/v % $(NH_4)_2SO_4$, 0.1 w/v % $MgSO_4.7H_2O$, 0.5 v/v % trace metal salt solution (prepared by dissolving, in 0.1 N hydrochloric acid, 1.6 w/v % $FeCl_3.6H_2O$, 1 w/v % $CaCl_2.2H_2O$, 0.02 w/v % $CoCl_2.6H_2O$, 0.016 w/v % $CuSO_4.5H_2O$, and 0.012 w/v % $NiCl_2.6H_2O$), and 0.05 w/v % BIOSPUREX 200K (defoaming agent: manufactured by Cognis Japan Ltd.).

First, a glycerol stock (50 μl) of KNK-005 strain was inoculated into the seed medium (10 ml) and seed-cultured for 24 hours. Then, the resulting seed culture was inoculated at 1.0 v/v % into a 3-liter jar fermenter (MDL-300 manufactured by B. E. MARUBISHI Co., Ltd.) containing 1.8 L of the preculture medium. Preculture was performed for 28 hours under operation conditions where a culture temperature was 33° C., a stirring speed was 500 rpm, and a ventilation volume was 1.8 L/min while pH was controlled to be in the range of 6.7 to 6.8. The pH control was performed by using a 14% aqueous ammonium hydroxide solution.

Then, the resulting preculture was inoculated at 1.0 v/v % into a 10-liter jar fermenter (MDS-1000 manufactured by B. E. MARUBISHI Co., Ltd.) containing 6 L of the production medium. Culture was performed under operation conditions where a culture temperature was 28° C., a stirring speed was 400 rpm, and a ventilation volume was 6.0 L/min while pH was controlled to be in the range of 6.7 to 6.8. The pH control was performed by using a 14% aqueous ammonium hydroxide solution. Palm oil was used as a carbon source. The culture was performed for 64 hours. After the completion of the culture, cells were collected by centrifugal separation, washed with methanol, and lyophilized, and the weight of the dried cells was measured.

One hundred milliliters of chloroform was added to one gram of the obtained dried cells, and the resulting mixture was stirred at room temperature all day and night to extract the P3HA from the cells. The mixture was filtered to remove the cell residue, and then the resulting filtrate was concentrated by an evaporator until its total volume became 30 ml. Thereafter, 90 ml of hexane was gradually added to the filtrate, and the resulting mixture was left for 1 hour in the state of being gently stirred. The mixture was filtered to separate the deposited P3HA, and then the polyester resin was vacuum-dried at 50° C. for 3 hours. In this manner, the P3HA was obtained.

The 3HH content of the obtained P3HA was measured by gas chromatography in the following manner. In a vessel, 2 ml of a sulfuric acid-methanol mixed liquid (15:85) and 2 ml of chloroform were added to 20 mg of the dried P3HA, and the vessel was tightly sealed. Then, the resulting mixture was heated at 100° C. for 140 minutes to obtain a methyl ester of P3HA degradation product. After cooling, 1.5 g of sodium hydrogen carbonate was added thereto little by little for neutralization, and the resulting mixture was left as it was until generation of carbon dioxide stopped. The mixture was well mixed with 4 ml of diisopropyl ether added thereto, and then centrifuged. Thereafter, the monomer unit composition of the polyester degradation product in a supernatant was analyzed by capillary gas chromatography. The gas chromatography was performed by using GC-17A manufactured by Shimadzu Corporation as a gas chromatograph and NEUTRA BOND-1 (with a column length of 25 m, a column inner diameter of 0.25 mm, and a liquid film thickness of 0.4 μm) manufactured by GL Sciences Inc. as a capillary column. He gas was used as a carrier gas; a column inlet pressure was set to 100 kPa; and a sample was injected in an amount of 1 μl. Temperature conditions were as follows: the temperature was increased from an initial temperature of 100° C. to 200° C. at a rate of 8° C./min, and was further increased from 200° C. to 290° C. at a rate of 30° C./min. As a result of the analysis performed under the above conditions, the P3HA was found to be poly(3-hydroxybutyrate-co-3-hydroxyhexanoate) (P3HB3HH) as represented by the chemical formula (1). The content of the 3-hydroxyhexanoate (3HH) was 5.6 mol %.

After the completion of the culture, P3HB3HH was obtained from the culture solution by the method described in International Publication No. WO 2010/067543. The P3HB3HH had a weight-average molecular weight of 600,000 as measured by GPC.

P3HA-2: one obtained in Production Example 2 was used.

Production Example 2

P3HB3HH, i.e., poly(3-hydroxyalkanoate) raw material, was obtained in the same manner as in Production Example 1, except that KNK-631 strain was used and palm kernel oil was used as a carbon source. The P3HB3HH had a weight-average molecular weight of 650,000, and the 3HH content therein was 11.4 mol %.

P3HA-3: one obtained in Production Example 3 was used.

Production Example 3

By using *C. necator* H16 strain (ATCC17699) as a production strain, P3HB having a weight-average molecular weight of 850,000 was prepared in accordance with International Publication No. WO 09/145164.

P3HA-4: EM5400F (P3HB4HB) manufactured by Ecomann was used.

Other materials used in Examples and Comparative Examples are indicated below.

Pentaerythritol (C): pentaerythritol (Neulizer P manufactured by The Nippon Synthetic Chemical Industry Co., Ltd.)

Silicate (D): talc (MICRO ACE K-1 manufactured by Nippon Talc Co., Ltd.)

Example 1

(Production of Polyester Resin Composition)

PLA-1 as the polylactic acid (A), P3HA-1 as the poly(3-hydroxyalkanoate) (B), the pentaerythritol (C), and talc as the silicate (D) were blended at a blending ratio shown in Table 1 (blending ratios shown in the table presented below are expressed in part(s) by weight) and melt-kneaded by using an intermeshed co-rotation twin screw extruder (TEM-26SS manufactured by TOSHIBA MACHINE CO., LTD.) at a setting temperature of 160 to 180° C. and a screw rotation speed of 100 rpm to obtain a polyester resin composition. At the time, the resin temperature was 188° C. The temperature of the molten resin discharged from a die was directly measured with a type K thermocouple and defined as the resin temperature. The polyester resin composition was extruded through the die to be a strand, and the strand was cut to obtain pellets. The obtained pellets were dehumidified and dried at 80° C. to remove water therefrom.

(Injection Molding)

The obtained pellets made of the polyester resin composition were used as a raw material and molded into a bar-shaped test piece complying with ASTM D-648 standard by using an injection molding machine (Si-100IV manufactured by TOYO MACHINERY & METAL CO., LTD.) under the following conditions: the cylinder setting temperature of the molding machine was 160 to 195° C.; and the setting temperature of a mold (molding temperature) was 40° C.

(Deflection Temperature Under Load)

The bar-shaped test piece obtained by the injection molding was stored for one month in the atmosphere at a temperature of 23° C. and a humidity of 50%. Thereafter, the test piece was subjected to deflection temperature under load measurement in accordance with the method B of ASTM D-648, and thereby the deflection temperature under load (hereinafter, abbreviated as "DTUL" in some cases) of the test piece was measured. The higher the deflection temperature under load is, the better it is.

(Burr Evaluation)

The test piece obtained by the above injection molding was visually observed for burr evaluation. In the burr evaluation, when no burr formation was found, the test piece was evaluated as Good, and when burr formation was found, the test piece was evaluated as Poor.

Examples 2 to 5

In each of Examples 2 to 5, pellets of a polyester resin composition and a bar-shaped test piece were prepared in the same manner as in Example 1 at a blending ratio shown in Table 1, and the deflection temperature under load measurement and burr evaluation were performed on each test piece. The results are shown in Table 1.

Comparative Examples 1 to 6

In each of Comparative Examples 1 to 6, pellets of a polyester resin composition and a bar-shaped test piece were prepared in the same manner as in Example 1 at a blending ratio shown in Table 1, and the deflection temperature under load measurement and burr evaluation were performed on each test piece. The results are shown in Table 1.

TABLE 1

Components and Properties of Injection-Molded Article (Components are expressed in units of parts by weight.)

| | | EX. 1 | EX. 2 | EX. 3 | EX. 4 | EX. 5 | Comp. EX. 1 | Comp. EX. 2 | Comp. EX. 3 | Comp. EX. 4 | Comp. EX. 5 | Comp. EX. 6 |
|---|---|---|---|---|---|---|---|---|---|---|---|---|
| Main Raw Materials Used | Polylactic acid (A) | PLA-1 | PLA-2 | PLA-2 | PLA-2 | PLA-1 | PLA-2 | PLA-1 | PLA-1 | PLA-1 | PLA-1 | PLA-1 |
| | Poly(3-hydroxyalkanoate) (B) | P3HA-1 | P3HA-2 | P3HA-3 | P3HA-4 | P3HA-2 | — | P3HA-1 | P3HA-1 | P3HA-2 | P3HA-1 | P3HA-2 |
| Components | PLA-1 | 60 | | | | 60 | | 60 | 60 | 60 | 80 | 40 |
| | PLA-2 | | 60 | 70 | 60 | | 100 | | | | | |
| | P3HA-1 | 40 | | | | | | 40 | 40 | | 20 | |
| | P3HA-2 | | 40 | | | 40 | | | | 40 | | 60 |
| | P3HA-3 | | | 30 | | | | | | | | |
| | P3HA-4 | | | | 40 | | | | | | | |
| | Pentaerythritol | 1 | 1.5 | 1 | 1.5 | 1 | | | 1 | | 1 | 1 |
| | Silicate | 30 | 30 | 20 | 30 | 30 | | | | 30 | 30 | 10 |
| Evaluation | DTUL (° C.) | 87 | 91 | 90 | 89 | 85 | 55 | 58 | 60 | 62 | 59 | 73 |
| | Burr | Good | Good | Good | Good | Good | Good | Good | Good | Good | Good | Poor |

As shown in Table 1, Comparative Example 1 only contains the polylactic acid. For this reason, Comparative Example 1 exhibits low thermal resistance and a low deflection temperature under load. Comparative Example 2 only contains the polylactic acid and poly(3-hydroxyalkanoate). For this reason, Comparative Example 2 exhibits a low deflection temperature under load. Comparative Example 3 contains no silicate. For this reason, Comparative Example 3 exhibits a low deflection temperature under load. Comparative Example 4 contains no pentaerythritol. For this reason, Comparative Example 4 exhibits a low deflection temperature under load. In Comparative Example 5, the proportion of the polylactic acid is high. For this reason, Comparative Example 5 exhibits a low deflection temperature under load. Comparative Example 6 exhibits burr formation on the test piece since the proportion of the poly(3-hydroxyalkanoate) is high. On the other hand, in Examples 1 to 5, the polylactic acid is mixed with three components, i.e., poly(3-hydroxyalkanoate), pentaerythritol, and silicate. Therefore, each of Examples 1 to 5 exhibits a high deflection temperature under load even with a high proportion of the polylactic acid, and exhibits no burr formation on the test piece.

Example 6

(Production of Polyester Resin Composition)

Pellets of a polyester resin composition were prepared in the same manner as in Example 1 at a blending ratio shown in Table 2.

(Extrusion Forming)

By using a single screw extruder (Labo Plastmill of the type "20C200" manufactured by Toyo Seiki Seisaku-Sho, Ltd.) to which a T-die having a width of 150 mm and a lip width of 1.5 mm was attached, the prepared pellets made of the polyester resin composition and used as a raw material were extruded under the conditions of a cylinder setting temperature of 160 to 200° C. and a chill roll setting temperature of 50° C., and thereby a sheet with a thickness of 1 mm was obtained. The obtained sheet was subjected to heat sag evaluation. The evaluation result is shown in Table 2.

(Heat Sag Test)

The sheet obtained by the above extrusion forming was stored for one month in the atmosphere at a temperature of 23° C. and a humidity of 50%. Thereafter, a strip-shaped test piece having a width of 12.7 mm and a length of 75 mm was punched out of the sheet. The strip-shaped test piece was subjected to a heat sag test complying with JIS K 7195 (except the thickness and length). In the heat sag test, when the deflection of the strip-shaped test piece was not more than 10 mm at a test temperature of 60° C., the test piece was evaluated as Good, and when the deflection of the test piece was more than 10 mm at the test temperature of 60° C., the test piece was evaluated as Poor. The less the deflection of the test piece is, the higher the thermal resistance is.

Comparative Example 7

Pellets and a sheet of a polyester resin composition were prepared and a heat sag test and evaluation were performed in the same manner as in Example 6 at a blending ratio shown in Table 2. The evaluation result is shown in Table 2.

Comparative Example 8

Pellets and a sheet of a polyester resin composition were prepared and a heat sag test and evaluation were performed in the same manner as in Example 6 at a blending ratio shown in Table 2. The evaluation result is shown in Table 2.

Comparative Example 9

Pellets and a sheet of a polyester resin composition were prepared and a heat sag test and evaluation were performed in the same manner as in Example 6 at a blending ratio shown in Table 2. The evaluation result is shown in Table 2.

TABLE 2

Components and Properties of Injection-Molded Article
(Components are expressed in units of parts by weight.)

| | | Example 6 | Comparative Example 7 | Comparative Example 8 | Comparative Example 9 |
|---|---|---|---|---|---|
| Main Raw Materials Used | Polylactic acid (A) | PLA-3 | PLA-3 | PLA-3 | PLA-3 |
| | Poly(3-hydroxyalkanoate) (B) | P3HA-1 | — | — | P3HA-1 |
| Components | PLA-1 | | | | |
| | PLA-2 | | | | |
| | PLA-3 | 55 | 100 | 100 | 80 |
| | P3HA-1 | 45 | | | 20 |
| | P3HA-2 | | | | |
| | P3HA-3 | | | | |
| | P3HA-4 | | | | |
| | Pentaerythritol | 1 | | 1 | 1 |
| | Silicate | 10 | | 30 | 30 |
| Evaluation | Heat sag | Good | Poor | Poor | Poor |

As shown in Table 2, Comparative Example 7 only contains the polylactic acid. For this reason, the sheet deflects greatly. Comparative Example 8 contains no poly (3-hydroxyalkanoate). For this reason, the sheet deflects greatly. In Comparative Example 9, the proportion of the poly(3-hydroxyalkanoate) is low. For this reason, the sheet deflects greatly. On the other hand, in Example 6, the polylactic acid is mixed with three components, i.e., poly (3-hydroxyalkanoate), pentaerythritol, and silicate. Therefore, the sheet does not deflect greatly, and has high thermal resistance.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A polyester resin composition comprising:

a polylactic acid;

a poly(3-hydroxyalkanoate);

pentaerythritol; and a silicate, wherein:

an amount of the polylactic acid is from 55 to 75 parts by weight, and an amount of the poly(3-hydroxyalkanoate) is from 25 to 45 parts by weight, with respect to 100 parts by weight of a total amount of the polylactic acid and the poly(3-hydroxyalkanoate);

an amount of the pentaerythritol is from 0.05 to 20 parts by weight with respect to 100 parts by weight of the total amount of the polylactic acid and the poly(3-hydroxyalkanoate); and an amount of the silicate is from 10 to 40 parts by weight with respect to 100 parts by weight of the total amount of the polylactic acid and the poly(3-hydroxyalkanoate).

2. The polyester resin composition according to claim 1, wherein the silicate is at least one selected from the group consisting of talc, mica, kaolinite, montmorillonite, and smectite.

3. The polyester resin composition according to claim 1, wherein the poly(3-hydroxyalkanoate) is at least one selected from the group consisting of poly(3-hydroxybutyrate), poly (3-hydroxybutyrate-co-3-hydroxyvalerate), poly(3-hydroxybutyrate-co-3-hydroxyvalerate-co-3-hydroxyhexanoate)poly(3-hydroxybutyrate-co-3-hydroxyhexanoate), and poly(3-hydroxybutyrate-co-4-hydroxybutyrate).

4. A polyester resin formed article produced by melting the polyester resin composition according to claim 1 and then forming the molten polyester resin composition at 25 to 55° C.

5. The polyester resin composition according to claim 2, wherein the poly(3-hydroxyalkanoate) is at least one selected from the group consisting of poly(3-hydroxybutyrate), poly (3-hydroxybutyrate-co-3-hydroxyvalerate), poly(3-hydroxy butyrate-co-3-hydroxyvalerate-co-3-hydroxyhexanoate), poly(3-hydroxybutyrate-co-3-hydroxyhexanoate), and poly(3-hydroxybutyrate-co-4-hydroxybutyrate).

* * * * *